Figure 1:
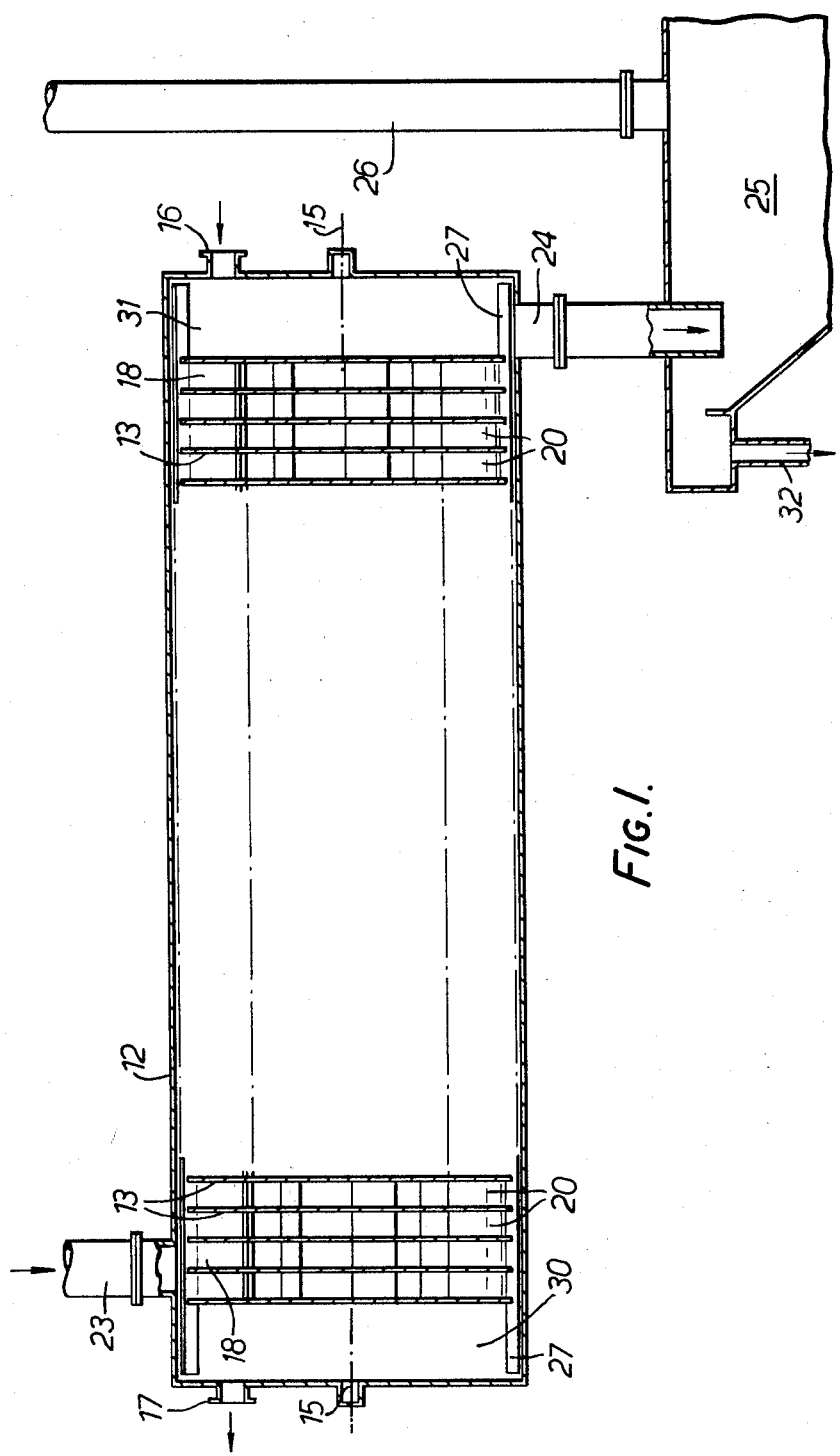

United States Patent [19]

Hohlbaum

[11] 4,244,923

[45] Jan. 13, 1981

[54] APPARATUS FOR AND METHODS OF CONTACTING MATERIALS

[75] Inventor: Theodor J. M. Hohlbaum, Ilford, England

[73] Assignee: RTL Contactor Holding S.A., Switzerland

[21] Appl. No.: 962,967

[22] Filed: Nov. 22, 1978

[51] Int. Cl.³ .......................... B01F 3/12; B01F 7/08
[52] U.S. Cl. .................................... 422/225; 422/273
[58] Field of Search ............... 422/135, 137, 225, 226, 422/269-273

[56] References Cited

U.S. PATENT DOCUMENTS

| 2,433,552 | 12/1947 | Haney et al. ................. 422/272 X |
| 3,591,344 | 7/1971 | Schnock et al. ................. 422/135 |
| 3,649,209 | 3/1972 | Coleby ................. 422/269 |

FOREIGN PATENT DOCUMENTS 8912  5/1916  United Kingdom .................. 422/269

1527269 10/1978 United Kingdom .

Primary Examiner—William A. Cuchlinski, Jr.
Attorney, Agent, or Firm—Bernard & Brown

[57] ABSTRACT

A solids/liquid contactor comprises a drum through which a slurry phase and a treatment liquid phase pass, a rotor within the drum including a plurality of axially-spaced discs dividing the drum interior into a series of compartments, the edges of the discs being spaced from the wall of the drum to form an annular passage for the movement of the phases from compartment to compartment, for each of at least some of the compartments, a plurality of receptacles mounted to rotate with the rotor and designed to receive material of one phase and to shower it into the other phase as the rotor turns, and at least one blade which is carried by the rotor, which penetrates into the annular passage, and which is operable to maintain the passage at least partly clear of stationary solids.

13 Claims, 8 Drawing Figures

APPARATUS FOR AND METHODS OF CONTACTING MATERIALS

This invention relates to apparatus for contacting materials, and is particularly concerned with a slurry-/liquid contactor, in which the slurry is either introduced into the contactor or in which a solids phase and a carrier liquid are separately introduced and a slurry is formed within the contactor. In the contactor, the slurry is brought intimately and continually into contact with a treatment liquid phase, which is substantially immiscible with the carrier liquid or the liquid of the slurry and which has a lower specific gravity than that latter liquid. A contactor of the invention may be appied to the treatment of oil-sands with hot water or with a solvent for the bitumen oil constituents of the oil-sands, in order to extract the bitumen oils, as described for example in U.K. patent application No. 1,527,269.

In U.S. Pat. No. 3,649,209 there is described a solids-liquid contactor comprising a drum through which the phases can pass, preferably in countercurrent, a rotor within the drum including a plurality of axially-spaced discs dividing the drum interior into a series of compartments, the edges of the discs being spaced from the wall of the drum to form annular passages for the movement of the phases from compartment to compartment, and, for each of at least some of the compartments, a plurality of receptacles mounted to rotate with the rotor and designed to receive material of one phase and to discharge it into the other phase as the rotor turns. When a slurry is treated in such a contactor, the slurry and the treatment liquid phases travel through the contactor with a substantially stable interface between the treatment liquid phase and the liquid of the slurry, that interface usually being arranged to pass through the drum axis. The invention is generally concerned with such a contactor.

Because, in the contactor of U.S. Pat. No. 3,649,209, the receptacles are carried within the peripheries of the discs, there is a serious possibility of the solids of the slurry settling to the bottom of the stationary drum and forming a stationary, and often compacted, layer of solids over a substantial sector at the lower part of the drum. That layer, if allowed to remain, obstructs the movement of the slurry from compartment to compartment and prevents the proper operation of the contactor. In particular, the presence of a stationary layer of solids at the annular passages increases the pressure drop along the drum and may necessitate the tilting of the axes of the drum and rotor away from the horizontal, in order to maintain the interface between the treatment phase and the liquid of the slurry approximately at the drum axis.

U.S. Pat. No. 3,649,209 suggests having apertures through the discs adjacent the disc peripheries. While those apertures provide additional means for enabling the solids to move from compartment to compartment, they also allow the free flow of the treatment liquid phase between compartments and there is the danger that a substantial part of that phase may move axially and continuously through the drum, without taking part in the contacting operation. The use of apertures through the discs thus is not an ideal solution.

An object of the present invention is to provide a slurry/liquid contactor design in which blocking or partial blocking of the annular passages between the disc edges and the drum is prevented and, according to the present invention, that objective is achieved by having at least one blade which is carried by the rotor, which penetrates into the annular passage and which is operable to maintain the passages at least partly clear of stationary solids. Thus the blade may have the form of a plough extending from the discs and into the annular passage. It is an advantage if the blade is helical about the rotor axes, in order to promote movement of solids axially along the drum in the manner of a screw conveyor. It is however more important that the blade or the blades should maintain the solids in suspension so that, firstly, they do not form an obstructive layer at the bottom of the contactor drum, and, secondly, that they may readily be captured by the receptacles and thus brought into intimate contact with the liquid phase.

For efficient operation of the contactor, it is necessary to avoid back-mixing of the two phases as they pass from one compartment to the next, i.e. at the top part and bottom part of the annular gap for the respective phases. Typically the treatment liquid phase has a much lower flow rate than the slurry and usually has a lower viscosity than the slurry. For this reason, it is desirable to have a larger annular gap at the bottom of the contactor and a narrower gap at the top. This is achieved, according to a subsidiary feature of the invention, by eccentrically mounting the rotor in the drum with the rotor axis above the drum axis; as a consequence, the annular passage is narrower at the top than at the bottom. If the blade or blades then engage the drum wall at the top of the contactor, it or they should be stiffly flexible to accommodate itself or themselves to the variation in the separation between the edges of the discs and the drum at the top of the contactor.

In the past, the slurry has been formed externally of the contactor and pumped into and out of the drum, using slurry pumps. That arrangement has some disadvantages, and, according to a subsidiary feature of the invention, the drum has a supply opening and a discharge opening for slurry or solids respectively in the upper half of the drum at one end and at or adjacent the bottom of the drum at the other end; the openings are arranged for gravity feed of the slurry or solids into and out of the drum. With some solids, it is then possible to introduce the solids and the liquid of the slurry separately into the drum, slurrying being performed within the drum.

Figure 1A:
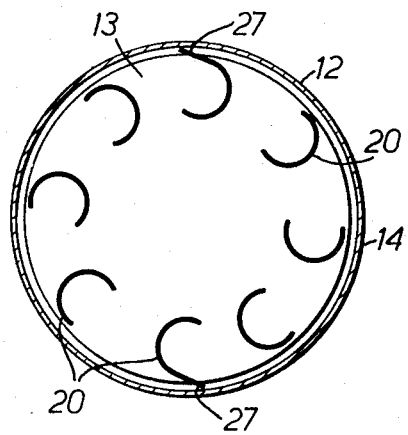
Figure 5:
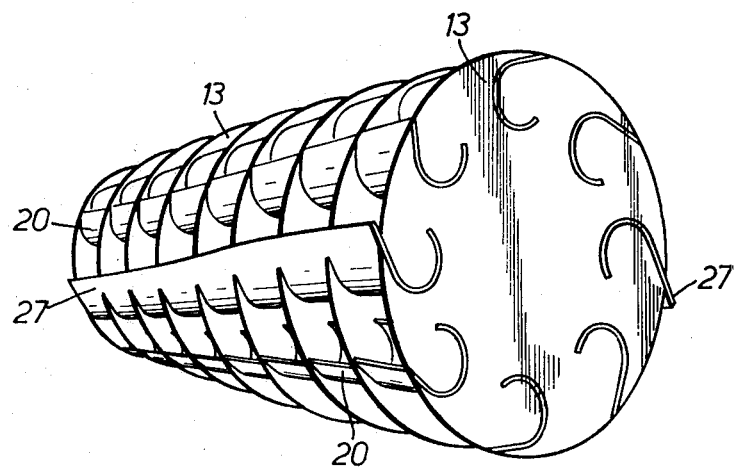
Figure 2:
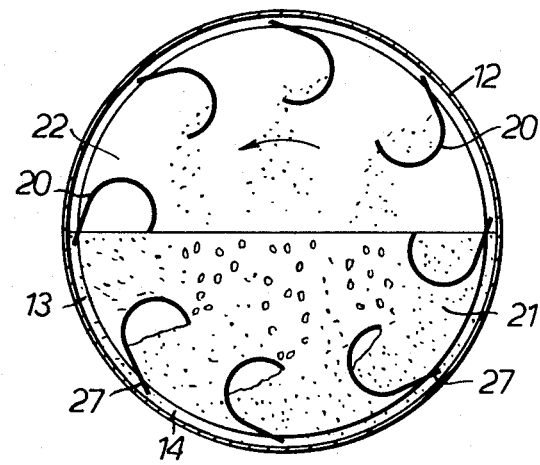
Figure 4:
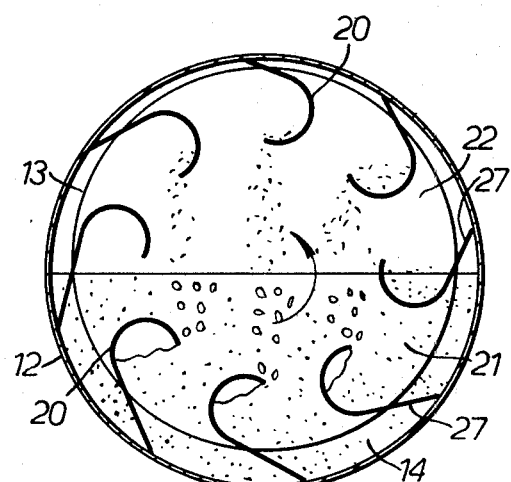
Figure 3:
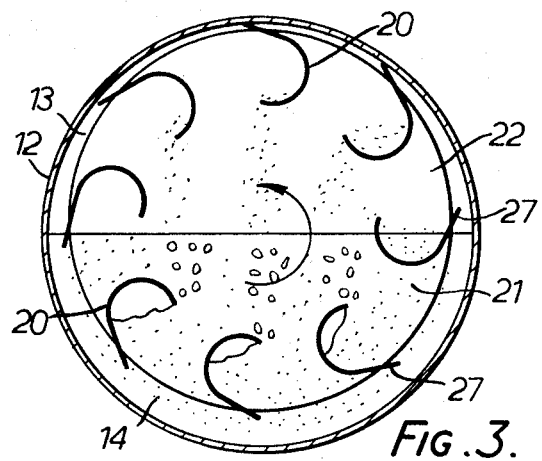
Figure 6:
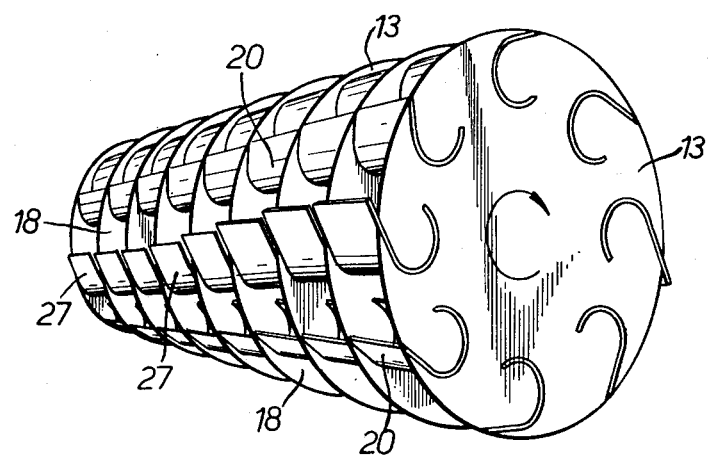
Figure 7:
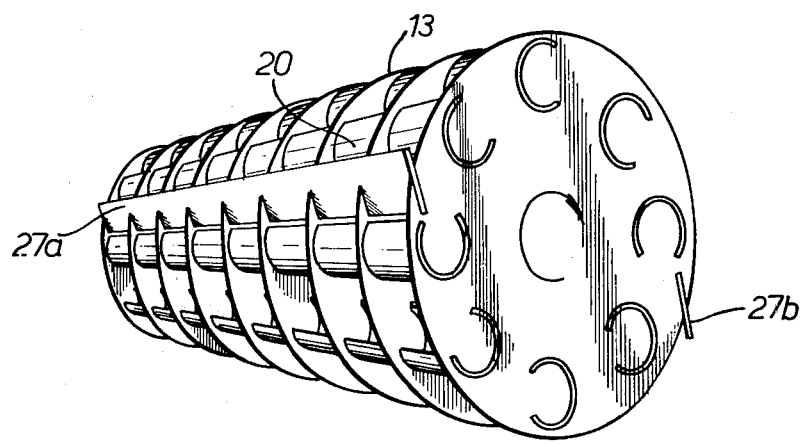

The invention will be more readily understood by way of example from the following description of contactors in accordance therewith, reference being made to the accompanying drawings, in which:

FIG. 1 is an axial section through a contactor and illustrates the feed and discharge of solids or a slurry, FIG. 1A is an end view of the rotor of the contactor of FIG. 1, FIG. 2 is a radial section through a contactor and illustrates the use of plough blades, FIGS. 3 and 4 are sections similar to that of FIG. 2 and illustrate modifications, and FIGS. 5, 6 and 7 are perspective views of the contactor rotor showing different forms of plough blades.

The contactor is generally as described and illustrated in U.S. Pat. No. 3,649,209, but does not have the apertures in the contactor discs described in that specification. The contactor is employed for contacting a slurry with a liquid which is immiscible with the liquid of the slurry and has a lower specific gravity than either the liquid or the solids of the slurry. An example is the treatment of oil/sands with a solvent for the extraction of the bitumen oils, as described in U.K. patent specification No. 1,529,269.

The contactor comprises a stationary, cylindrical, drum 12 and a rotor within the drum consisting of a number of radially arranged and axially-spaced, circular discs 13, the edges of which are spaced from the wall of drum 12 to form an annular passage 14 (FIG. 1A) between the rotor and the drum. The rotor is mounted on a shaft which is indicated schematically at 15, passes through rotary seals in the end plates of the drum, is mounted in bearings externally of the drum, and is driven at one end. The shaft 15 is normally coaxial with the drum and the axes of the drum and rotor are slightly inclined to the horizontal in order to maintain the interface between the two liquid phases substantially at the drum axis.

The slurry is continuously introduced into the drum 12 at one end and is discharged from the other. Simultaneously, a treatment liquid stream, which in the case of oil/sand is a solvent for the bitumen oils, is fed through an inlet port 16 at the other end and passed in countercurrent to the flow of the slurry, before leaving the drum through exit port 17 at the first end. The two streams—the slurry and the treatment liquid—move countercurrent through the drum 12 in separate phases, the lighter treatment liquid phase being uppermost.

Each of the compartments 18, into which the drum 12 is divided by the discs 13, has receptacles in the form of buckets 20 which rotate with the rotor. The buckets are generally as described in U.S. Pat. No. 3,649,209 and are carried by, and extend between, the discs 13. As the rotor turns, the buckets collect material of the lower slurry phase 21 (FIGS. 2 to 4) and shower it into the upper phase 22 so that it comes into intimate contact with the treatment phase. As the buckets descend through the phases, they draw the lighter phase 22 downwardly into the heavier phase 21 and discharge the former as droplets into the latter.

FIG. 1 also illustrates the preferred method of introducing the solids or slurry phase into the contactor and for removing that phase therefrom. The drum 12 has an entry opening 23 at one end (the left-hand end in FIG. 1) and at its highest point, and a discharge opening 24 at the other end (the right-hand end) at the lowest point.

The solids or slurry phase are fed under gravity, as from a reservoir above the drum 12, and fall through the opening 23 into the first compartments of the rotor. At the discharge end, the treated slurry, e.g., the sand and water of the oil-sands after removal of the bitumen oils, falls by gravity through the discharge opening 24 into a settling tank 25 provided with a stand pipe 26 which extends to a height above the contactor drum 12. The solids settle out in tank 25 and can be removed at the bottom, while the liquid content of the slurry discharge at 32.

By virtue of the gravity feed and discharge from the drum 12, no pumping of the solids or slurry phase to the contactor is necessary and, for that reason, it is possible to charge the solids into the contactor either with no water or with only a minimum of added water, the slurry being formed in the drum 12 with water injected separately into the drum 12.

The ends of the rotor are spaced from the ends of the drum 12 to form settling chambers 30 and 31. In the first compartments of the rotor the solids are gradually reduced to a slurry.

As has been explained above, the formation of a stationary layer of solids in the annular passage 14 at the bottom of the drum is to be avoided, because such a layer reduces the flow of the slurry through the contactor. In order to prevent the formation of such a stationary layer, and to maintain the solids in suspension at the bottom of the drum 12, the rotor carries a plough blade or blades which extends beyond the periphery of the discs 13 into the annular passage 14. FIGS. 1 and 1A show two such blades 27, extending from, and forming a continuation of, two diametrically opposed buckets 20. As the rotor turns the annular passage 14 is scoured by the plough blades 27 in turn and solids at the bottom of the annular passage are forced into suspension. Because, in the embodiment shown in FIGS. 1 and 1A, the blades 27 form extensions of the buckets 20, solids in the annular passage 14 are scooped into the adjacent bucket and are then raised through the drum before being showered into the upper phase 22.

The plough blades have an additional advantage: because of the slow flow rate of the treatment liquid, there is the possibility of a large proportion of the treatment liquid passing along the top of the annular gap without entering the compartments and being intermingled with the slurry; the plough blades act to move the treatment liquid down into the compartments.

It will be observed that the plough blades 27 extend into the chambers 30 and 31. In chamber 30, they prevent movement of the slurry in the wrong direction, while in chamber 31 they keep the stripped solids in partial suspension to aid their discharge through opening 24.

FIG. 2 shows a modification in which each of the buckets is provided with an integral plough blade 27. Both in that figure and in FIGS. 1 and 1A, the buckets are formed by channel members which extend the length of the rotor and are received in slots in the discs 13. The plough blades are formed integrally with the selected buckets. The plough blades then extend over the entire length of the annular passage 14, as best illustrated in FIG. 5.

As further illustrated in FIG. 5, the blades 27 are not necessarily aligned parallel to the rotor axis and it is an advantage if they follow a helical path about the axis. The blades 27 then perform a screwing action to urge the solids axially along the drum 12, in the manner of a screw conveyor. Where the blades 27 form extensions of the buckets, the buckets are similarly helically arranged, as in FIG. 5. Helical buckets 20 have the advantage that, as each bucket rises through the drum, the contained slurry is not discharged into the upper phase 22 at one axial location, but is showered from the bucket over its entire axial length.

While the FIG. 5 arrangement of plough blades is preferred, it is possible to have separate plough blades extending from successive compartments 18 as illustrated in FIG. 6.

In the modification shown in FIG. 3, the rotor is mounted eccentrically of the drum 12, with its axis immediately above the drum axis. The result is that the annular passage 14 between the edges of the disc 13 and the drum 12 is larger at the bottom of the drum than at the top. The larger width of the passage at the bottom facilitates the flow of solids from compartment to compartment, while the narrower width at the top ensures that the velocity of flow of the treatment liquid is maintained at a high value so that there is little tendency for the treatment liquid to back-mix, or move in the direction opposite to the general flow of the treatment liquid through the drum. The plough blades 27 are stiffly flexible, and at the top of the contactor engage the drum and accommodate themselves to the variations in the width of the annular passage.

It is preferred to have the plough blades 27 extend only part-way across the annular passage 14 as shown in FIGS. 1, 1A, 2 and the lower part of FIG. 3. However, in some circumstances, it may be desirable that they extend right across the passage and engage the interior wall of the drum 12. Such an arrangement is shown in FIG. 4 which is a modification of FIG. 3.

It is not essential that the plough blades should form extensions of the buckets 20 and instead they may be separate from the buckets, as shown in FIG. 7 at 27a and 27b. In that figure, each blade is formed as a strip of metal or plastics materials with spaced slits received in slots in the edges of the discs 13. Each blade 27a or 27b is located in advance of one of the buckets 20 in the direction of rotation of the rotor and is angled to direct the solids into the buckets.

It is also not essential that each of the compartments should contain the buckets 20; for example, the buckets may be omitted in intermediate compartments where reagents are introduced into the compartment or where components are discharged. Thus, compartments with buckets may alternate with compartments without buckets.

In the embodiments described above, the plough blades extend over the full axial length of the rotor, whereas in practice stationary solids in the bottom of the drum 12 opposite the edges of the discs 13 are likely to cause most obstruction to the flow of the slurry from compartment to compartment. Accordingly, in a further embodiment, the plough blades are restricted to the neighbourhood of the discs; each disc then carries at least one plough blade which protrudes into the annular passage 14 and extends axially a small distance each side of the disc.

I claim:

1. A solids/liquid contactor comprising
   (a) a drum through which a slurry phase and a liquid phase pass;
   (b) a rotor mounted for rotation within said drum, said rotor including
   (c) a plurality of axially-spaced discs dividing the interior of said drum into a series of compartments, the edges of said discs being spaced from the wall of said drum to form annular passages for the movement of said phases from compartment to compartment;
   (d) in each of at least some of said compartments, a plurality of receptacles mounted to rotate with said rotor and to receive material of one said phase and to shower it into the other phase as said rotor turns; and
   (e) at least one blade means which are carried by said rotor, which extends radially outwardly beyond the edges of said discs and axially over a substantial axial length of said rotor, and which are helical about the axis of said rotor, whereby movement of solids axially along said drum is promoted and said passages are kept at least partially clear of stationary solids.

2. A contactor according to claim 1, in which only every second compartment has said receptacles.

3. A contactor according to claim 1, in which the axis of said drum is horizontal or near-horizontal, and said rotor is mounted eccentrically with its axis above said drum axis.

4. A contactor according to claim 1, in which
   said drum has a supply opening and a discharge opening for slurry or solids in respectively the upper half of said drum at one end and at or adjacent the bottom of said drum at the other end,
   said openings being arranged for gravity feeds for the slurry or solids into and out of said drum.

5. A contactor according to claim 4, in which settling chambers are formed between the ends of said drum and the ends of said rotor.

6. A contactor according to claim 5, in which
   said at least one blade means extends into said settling chambers.

7. A contactor according to claim 1, in which said blade means comprise at least one blade which extends over a substantial axial length of said rotor.

8. A contactor according to claim 7, in which said blade is formed as an extension of some of said receptacles.

9. A contactor according to claim 7, in which said blade is independent of said receptacles.

10. A contactor according to claim 1, in which said blade means comprise at least one assembly of separate blades extending outwardly from said compartments.

11. A contactor according to claim 10, in which each said separate blade is formed as an extension of a receptacle.

12. A contactor according to claim 1, in which said blade means extend radially outwardly from the edges of said discs, only partway towards said drum wall.

13. A solids/liquid contactor comprising
   (a) a drum through which a slurry phase and a liquid phase pass;
   (b) a rotor mounted for rotation within said drum, said rotor including
   (c) a plurality of axially-spaced discs dividing the interior of said drum into a series of compartments, the edges of said discs being spaced from the wall of said drum to form annular passages for the movement of said phases from compartment to compartment;
   (d) in each of at least some of said compartments a plurality of receptacles mounted to rotate with said rotor and to receive material of one said phase and to shower it into the other phase as said rotor turns; and
   (e) at least one blade carried by at least some of said discs, entering said annular passages and limited axially to the vicinity of said discs.

* * * * *